Aug. 4, 1931.  D. H. LENTZ  1,817,632
PORTABLE FACTORY
Filed Nov. 7, 1930   3 Sheets-Sheet 1
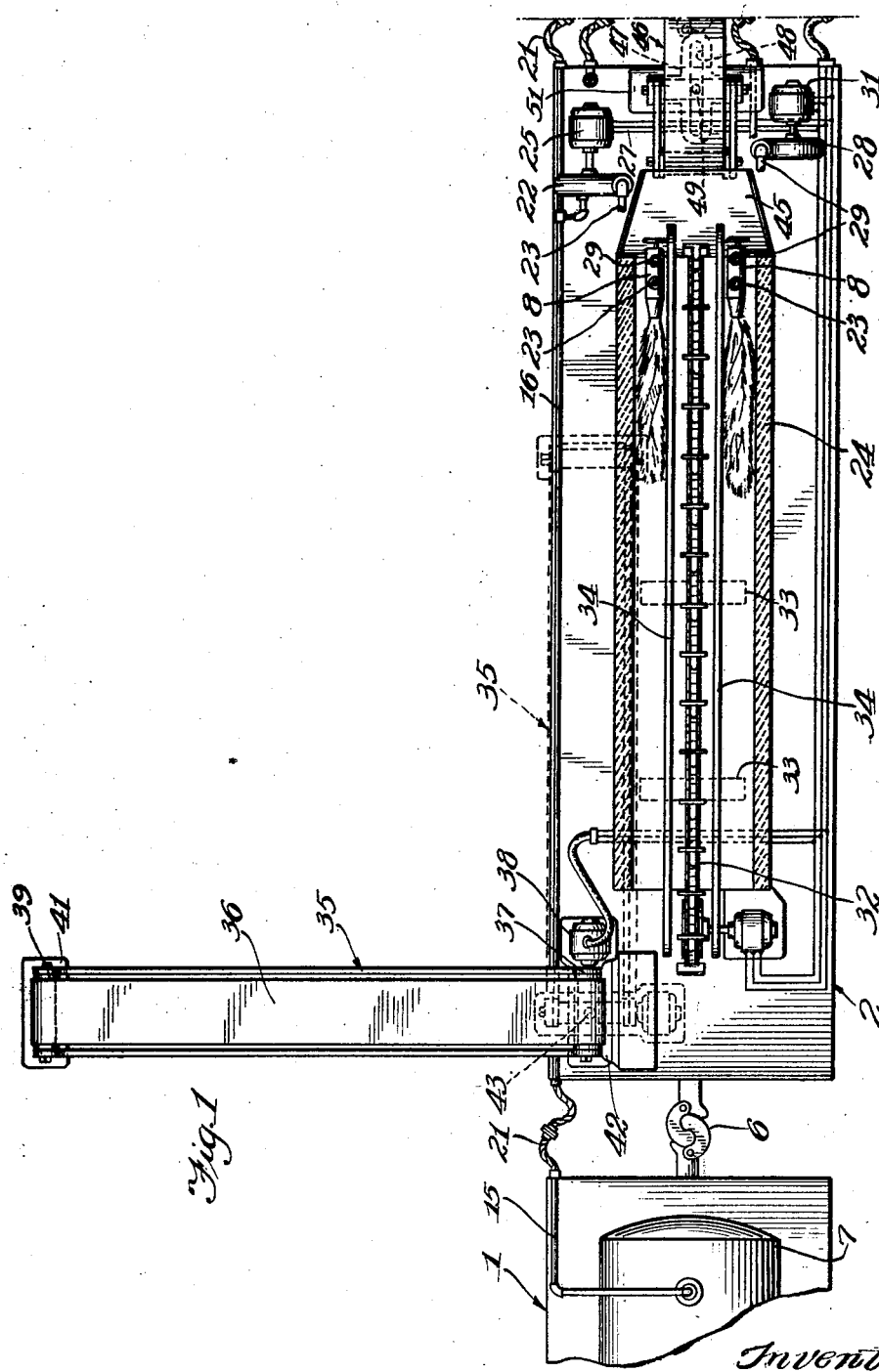
Inventor:
David H. Lentz
By Williams, Bradbury,
McCaleb & Hinkle. Attys.

Aug. 4, 1931.   D. H. LENTZ   1,817,632
PORTABLE FACTORY
Filed Nov. 7, 1930   3 Sheets-Sheet 2
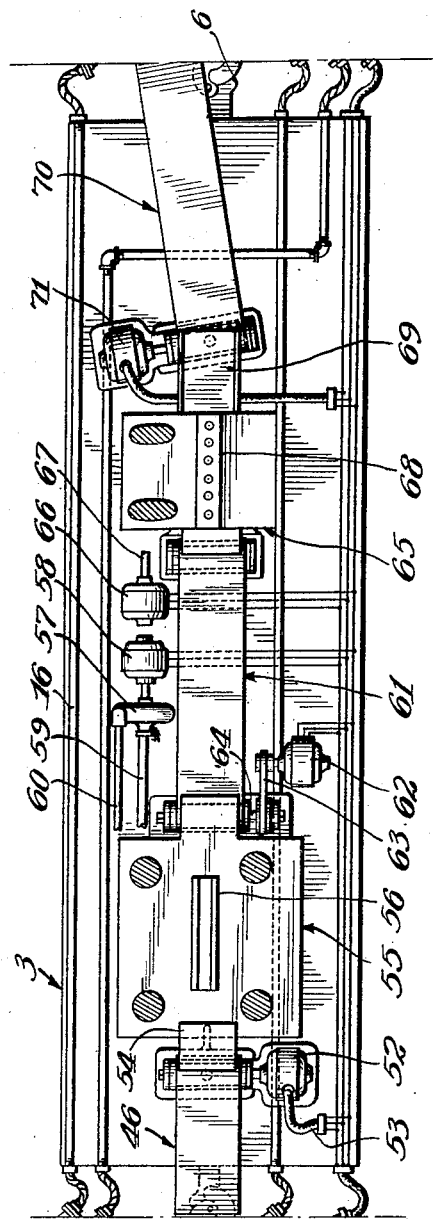

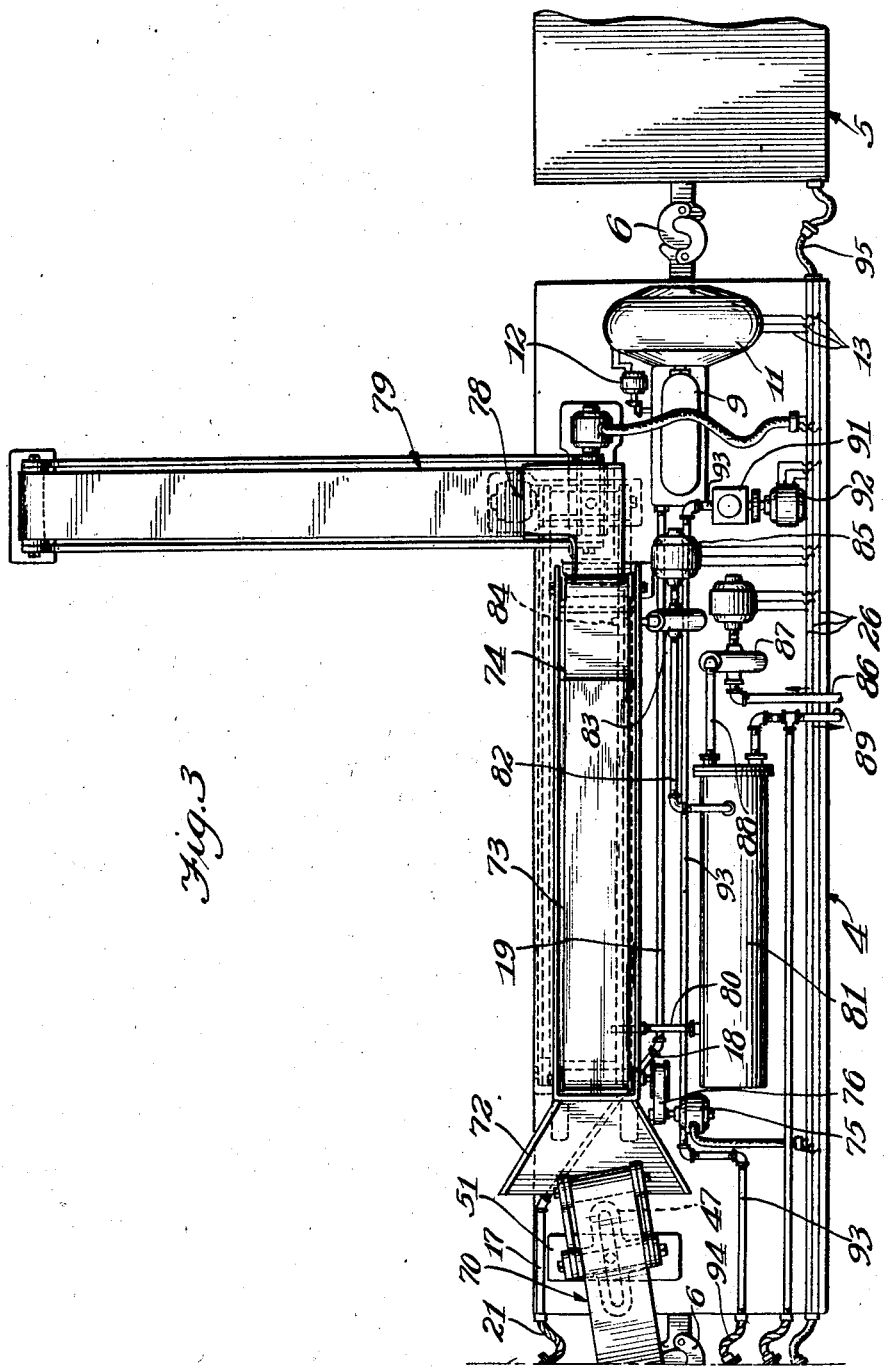

Patented Aug. 4, 1931

1,817,632

UNITED STATES PATENT OFFICE

DAVID H. LENTZ, OF JOLIET, ILLINOIS

PORTABLE FACTORY

Application filed November 7, 1930. Serial No. 494,039.

This invention relates to a portable plant or factory and more particularly to a portable plant in which railroad rail connecting splice bars or fish plates are reprocessed or reformed after they have been used a length of time and have had portions of the fishing partially worn away.

The process of reworking splice bars is well known and is an industry of considerable magnitude, the details of which form no part of this invention.

The main object of this invention is the provision of a splice bar reforming plant in combination with a vehicle or train of vehicles by which the plant may be transported from place to place and on which the plant remains while in operation.

It has been the practice in the production of new bars to place a factory at some convenient location and ship to it the necessary raw materials from various parts of the country or the world, then distribute the manufactured bars to the places of consumption. This practice is satisfactory in the original manufacture of bars and probably can not be improved upon, since all the raw materials which go into the manufacture of the original bars do not come from the same direction. In the reprocessing of the bars, no raw materials are used in the bars themselves as nothing is added to the bars to replace the worn surfaces. The bars are simply reshaped by a forging operation which changes the shape of the cross section.

It has been the general practice of railroads to have storehouses and shops at various points along the lines and to ship old, worn splice bars to these points to be stored. When it is decided to have the bars reformed, it becomes necessary to reload them and ship them to a reforming plant where they are unloaded. After they are reformed they are again reloaded and reshipped back to the storage house or distribution center.

In many cases the excess labor and cost of so many loading, shipping and unloading operations becomes prohibitive so that the reformed plates become equally as expensive as the new plates or bars. It is particularly to overcome situations of this kind that my invention has been devised. In the employment of my invention, the portable reforming plant is transported on its own wheels by rail to the various storage houses along the railroad and many thousands of bars are reformed while at each storage house; then the plant is moved along to other storage houses and in this way gradually works its way back and forth across the continent. There are many places in some parts of Canada, Siberia and elsewhere where the nearest manufacturing plant is many hundreds of miles away and the reforming of bars by the old method of shipping and reshipping is prohibitive while there is not enough business within a reasonable radius of any one point to make it economical to construct a plant there.

A further object of my invention is the adaptation of a complete reforming plant for construction, transportation and operation on vehicles adapted to be moved about on the railroad and placed on a side track for operation.

A further object of my invention is the provision of such a portable bar reforming plant which is always assembled and ready to be operated and which does not need to be on a specially constructed track or even on a straight level track to operate satisfactorily.

Other objects and advantages of my invention will become apparent as the description proceeds.

In the accompanying drawings.

Figures 1, 2 and 3 are plan views with certain portions thereof broken away and in section, of three connected flat cars and parts of two other cars, which figures when placed end to end from left to right in numerical order illustrate a train of cars with a reforming plant combined and associated therewith and incorporating my invention.

The cars are designated as a whole from left to right respectively by numerals 1, 2, 3, 4 and 5. The cars are coupled together by the usual type of car couplers 6. On car number 1 is mounted an oil tank 7 which supplies fuel oil to the oil burners 8 and to the oil engine 9, the latter of which drives a generator 11 and an exciter 12 for the generator. The generator supplies power through the conductors 13 to operate the various motors throughout the plant, which will be hereinafter referred to more specifically. Oil from the tank 7 passes through conduits 15, 16, 17, 18 and 19 and through the flexible couplers 21 to the oil engine 9 and to the oil pump 22 which supplies oil through a conduit 23 to the oil burners 8 which furnish heat to the furnace 24 through which the bars are passed for heating them to a sufficient temperature to permit them to be reformed. The pump 22 is driven by an electric motor 25 which receives its power through conductors 26 and 27. A blower 28 supplies air through a conduit 29 to the oil burners 8 for mixing with the oil therein in a conventional manner. The blower 28 is driven by a motor 31.

The furnace 24 is provided with a continuously operating conveyor 32 which moves bars shown in broken lines at 33, through the furnace. A guide member 34 is positioned on each side of the conveyor 32 upon which the bars may slide in their movement through the furnace.

Car number 2 is provided with a conveyor 35 consisting of a suitable moving element 36 which is operated by means of a rotating member 37 driven by a motor 38. The opposite end of the moving element 36 passes over a roller 39 which is provided with a suitable base or support 41. The base 42 for the driven end of the conveyor is mounted for pivotal movement by a pin 43 and may be moved to the position shown in broken lines for purposes of transportation. As the bars 33 leave the furnace they fall onto a chute 45 which guides them to a conveyor 46 which is mounted in such a manner that it may be moved forwardly and backwardly to allow for the taking up of slack in the car couplers and which is also adapted for pivotal movement to accommodate itself to any shape of track over which the plant may be positioned or moving.

To adapt the conveyor 46 for this rectilinear and pivotal movement it is provided with a bracket 47 having a slot 48 therein and a pin 49 extending into the groove or slot 48 from the base member 51. The forward or driven end of conveyor 46 is mounted in the same manner as the driven end of conveyor 35. It is driven by an electric motor 52 which is coupled to the conductors 26 through the medium of a flexible cable 53. At the forward end of the conveyor 46 is positioned a plate or table 54 which receives the bars as they leave the conveyor and from which they may be moved to position on the forging press 55. The forging press 55 may be of any suitable design having dies 56. The upper portion of the press is cut away from the disclosure in Figure 2, as the details thereof form no part of this invention. The forging press is operated by oil pressure produced by the pump 57 driven by a motor 58. Oil is received from the forging press through a conduit 59 and is delivered to the forging press through a conduit 60.

At the discharge side of the forging press a conveyor 61 driven by a motor 62 through the medium of a belt 63 and a shaft 64, leads to the punch press 65, only a portion of which is shown for the purpose of clarifying the drawings as the details of the punch press form no part of this invention. The punch press 65 is preferably operated by a motor 66 through the medium of a shaft 67. The punch press 65 is provided with a suitable die 68 onto which plates are moved for the purpose of having the holes through the plate reformed and correctly spaced since they have been somewhat shifted and distorted by the reforming action of the forging press. As the connecting bars pass from the punch press they slide over a chute 69, the forward edge of which overhangs the rear end of a conveyor 70, which conveyor is driven by a motor 71 and is mounted in the same manner as the driven end of the conveyor 35 in Figure 1. The forward end of the conveyor 70 is provided with a base 51 and a bracket 47 for mounting in the same manner as the rearward end of the conveyor 46. As the bars leave the conveyor 70 they slide over a chute 72 into a bath of oil in a tank 73 through which they are moved by a conveyor 74 which is driven by a motor 75 through the medium of a belt 76. The conveyor 74 is moved at such a speed that the bars remain in the oil a predetermined length of time, which may be varied by changing the speed of operation of the motor 75. As the bars pass through the oil tank they are gradually lifted to an elevation above the oil therein and at the exit end thereof they pass onto a chute 78 which directs the bars onto a conveyor 79, which conveyor is constructed and mounted in substantially the same manner as is conveyor 35 for delivering the finished bars to the place of storage.

Oil from the tank 73 passes by way of conduit 80 to the cooler 81 and back by way of conduit 82, pump 83 and conduit 84 to the tank 73. The pump 83 is operated by a motor 85. Water is supplied to the cooler 81 through a conduit 86, a pump 87 and conduit 88 and is discharged therefrom through a conduit 89.

Air is compressed by the compressor 91 driven by a motor 92 and conducted to various parts of the plant by a conduit 93 and flexible couplers 94. Electricity for operating the various motors and for such other purposes as may be desired passes through the conductors 13 and 26 and through the flexible cables 95 between adjacent cars.

In the operation of my invention the plant is moved to a storage house at which it is to be operated and the conveyors 35 and 79 are pivotally moved to the position shown. The furnace is heated by the oil burners 8 and the motors are started by current from the generator 11 which is driven by the oil engine 9. Bars are placed on the conveyor 35 and transferred to the conveyor 32 which passes them through the furnace 24 in which they are heated to a relatively high temperature. Upon discharging from the furnace 24 they pass to the forging press by means of the conveyor 46 which is always in position regardless of the curvature of the track on which the plant is standing and regardless of the amount of slack between the cars, as this conveyor is pivoted at one end and mounted for pivotal and rectilinear movement at the other end. This conveyor moves bars to the table 54 from which they are moved to position in the forging press 55 and reformed. From the forging press 55 they are passed over the conveyor 61 to the punch press 65 in which the holes through the bar are correctly aligned and reformed. Upon discharging from the punch press 65 the bars pass over the conveyor 70 which is mounted identically with the conveyor 46 and then passed to the chute 72 which directs them into the cooling bath of oil in the tank 73. The bars are moved through the tank 73 by a conveyor 74 and discharged over the chute 78 and conveyor 79 in a relatively cool condition a completed product for distribution and use.

Although my invention may be susceptible of many modifications and alterations without departing from the spirit thereof, I desire to avail myself of such modifications as come within the scope of the appended claims.

I claim as my invention:

1. In combination with a plurality of connected railway cars, a bar reforming plant comprising a furnace on one car for heating the bars to be reformed, bar reforming means on a second car, a conveyor for moving bars from said furnace to said reforming means, mountings for said conveyor comprising means on one car pivotally supporting one end of the conveyor and means on the other car supporting the other end of said conveyor for pivotal and rectilinear movement, whereby the conveyor may automatically adjust itself for curvature of the railroad track and slack between the cars.

2. In combination with a plurality of connected railway cars, a bar reforming plant comprising a furnace on one car for heating the bars to be reformed, bar reforming means on a second car, a conveyor for moving bars from said furnace to said reforming means, mountings for said conveyor comprising means on one car pivotally supporting one end of the conveyor and means on the other car supporting the other end of said conveyor for pivotal and rectilinear movement, whereby the conveyor may automatically adjust itself for curvature of the railroad track and slack between the cars, cooling means on a third car for receiving the reformed bars, and means for conveying the bars from the second car to said cooling means.

3. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, mountings for said conveyor comprising means on one car pivotally supporting one end of the conveyor and means on the second car supporting the other end of said conveyor for pivotal and rectilinear movement, whereby the conveyor may automatically adjust itself for curvature of the railroad track and slack between the cars.

4. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, mountings for said conveyor comprising means on one car pivotally supporting one end of the conveyor and means on the second car supporting the other end of said conveyor for pivotal and rectilinear movement, whereby the conveyor may automatically adjust itself for curvature of the railroad track and slack between the cars, cooling means on a third car for receiving the reformed bars, and means for conveying the bars from the second car to the cooling means.

5. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, a conveyor for moving the bars from the second reforming means to a third car, mountings for each of said conveyors comprising means on one car pivotally supporting one end of the conveyor and means on another car supporting the other end of the conveyor for pivotal and rectilinear movement, whereby the conveyors may automatically adjust themselves for curvature of the railroad track and various degrees of slack between the cars.

6. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, a conveyor for moving bars from the second reforming means to a third car, mountings for each of said conveyors comprising means on one car pivotally supporting one end of the conveyor and means on another car supporting the other end of the conveyor for pivotal and rectilinear movement, whereby the conveyors may automatically adjust themselves for curvature of the railroad track and various degrees of slack between the cars, and cooling means on the third car for receiving and cooling the reformed bars.

7. In combination with a plurality of connected railway cars, a bar reforming plant comprising a furnace on one car for heating the bars to be reformed, bar reforming means on a second car, a conveyor for moving bars from said furnace to said reforming means, mountings for said conveyor comprising means on one car pivotally supporting one end of the conveyor and means on the other car supporting the other end of said conveyor for pivotal and rectilinear movement, whereby the conveyor may automatically adjust itself for curvature of the railroad track and slack between the cars, a conveyor pivotally mounted on the first said car for swinging movement to a position at one side thereof adapted to receive and convey bars to a point adjacent the entrance of said furnace.

8. In combination with a plurality of connected railway cars, a bar reforming plant comprising a furnace on one car for heating the bars to be reformed, bar reforming means on a second car, a conveyor for moving bars from said furnace to said reforming means, mountings for said conveyor comprising means on one car pivotally supporting one end of the conveyor and means on the other car supporting the other end of said conveyor for pivotal and rectilinear movement, whereby the conveyor may automatically adjust itself for curvature of the railroad track and slack between the cars, cooling means on a third car for receiving the reformed bars, and means for conveying the bars from the second car to said cooling means, a conveyor pivotally mounted on the first said car for swinging movement to a position at one side thereof adapted to receive and convey bars to a point adjacent the entrance of said furnace.

9. In combination with a plurality of connected railway cars, a bar reforming plant comprising a furnace on one car for heating the cars to be reformed, bar reforming means on a second car, a conveyor for moving bars from said furnace to said reforming means, mountings for said conveyor comprising means on one car pivotally supporting one end of the conveyor and means on the other car supporting the other end of said conveyor for pivotal and rectilinear movement, whereby the conveyor may automatically adjust itself for curvature of the railroad track and slack between the cars, cooling means on a third car for receiving the reformed bars, and means for conveying the bars from the second car to said cooling means, a conveyor pivotally mounted on the first said car for swinging movement to a position at one side thereof adapted to receive and convey bars to a point adjacent the entrance of said furnace, and a conveyor for discharging bars from the third car after they are cooled.

10. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, mountings for said conveyor comprising means on one car pivotally supporting one end of the conveyor and means on the second car supporting the other end of said conveyor for pivotal and rectilinear movement, whereby the conveyor may automatically adjust itself for curvature of the railroad track and slack between the cars, cooling means on a third car for receiving the reformed bars, and means for conveying the bars from the second car to the cooling means and a conveyor for discharging bars from the third car after they are cooled.

11. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, a conveyor for moving bars from the second reforming means to a third car, mountings for each of said conveyors comprising means on one car pivotally supporting one end of the conveyor and means on another car for supporting the other end of the conveyor for pivotal and rectilinear movement, whereby the conveyors may automatically adjust themselves for curvature of the railroad track and various degrees of slack between the cars, a conveyor pivotally mounted on the first said car for swinging movement to a position at one side thereof adapted to receive and convey bars to a point adjacent the entrance of said furnace.

12. In combination with a plurality of coupled railway cars, a bar reforming plant comprising a furnace on one car for heating the bars to be reformed, a plurality of bar reforming means on a second car for operating on the bars in sequence, means for conducting the bars from the first reforming means to the second reforming means, a conveyor for moving the bars from said furnace to the first reforming means, a conveyor for moving bars from the second reforming means to a third car, mountings for each of said conveyors comprising means on one car pivotally supporting one end of the conveyor and means on another car supporting the other end of the conveyor for pivotal and rectilinear movement, whereby the conveyors may automatically adjust themselves for curvature of the railroad track and various degrees of slack between the cars, and cooling means on the third car for receiving and cooling the reformed bars and a conveyor for discharging bars from the third car after they are cooled.

13. In combination with a plurality of connected railway cars, a bar reforming plant comprising a preheating furnace on one car, means for receiving and conveying bars to said furnace, means for conveying bars through said furnace to be heated, bar reforming means on a second car, and bar cooling means on a third car, and automatically adjustable conveyors for moving bars from the furnace to the bar reforming mechanism and from the bar reforming mechanism to the cooling means, said conveyors being pivotally mounted at one end and mounted for pivotal and rectilinear movement at the other end.

14. In combination with a plurality of connected railway cars, a bar reforming plant comprising a preheating furnace on one car, means for receiving and conveying bars to said furnace, means for conveying bars through said furnace to be heated, bar reforming means on a second car, and bar cooling means on a third car, and automatically adjustable conveyors for moving bars from the furnace to the bar reforming mechanism and from the bar reforming mechanism to the cooling means, said conveyors being pivotally mounted at one end and mounted for pivotal and rectilinear movement at the other end, means for moving the bars through the cooling means and means for receiving bars from the cooling means and discharge them from the third car.

In witness whereof, I hereunto subscribe my name this 31st day of October, 1930.

DAVID H. LENTZ.